Feb. 15, 1944.  C. J. WAGNER  2,341,965
SURGE BRAKE TRAILER COUPLING
Filed Jan. 26, 1942  2 Sheets-Sheet 1
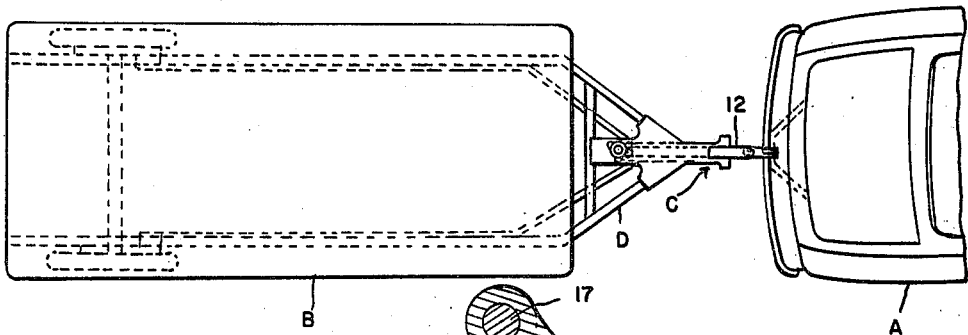
FIG.1.
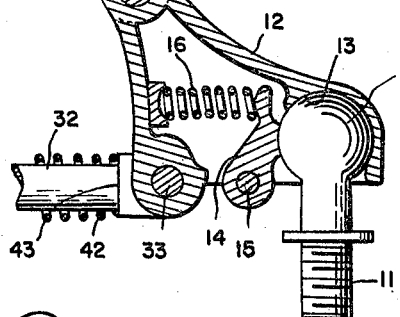
FIG.4.
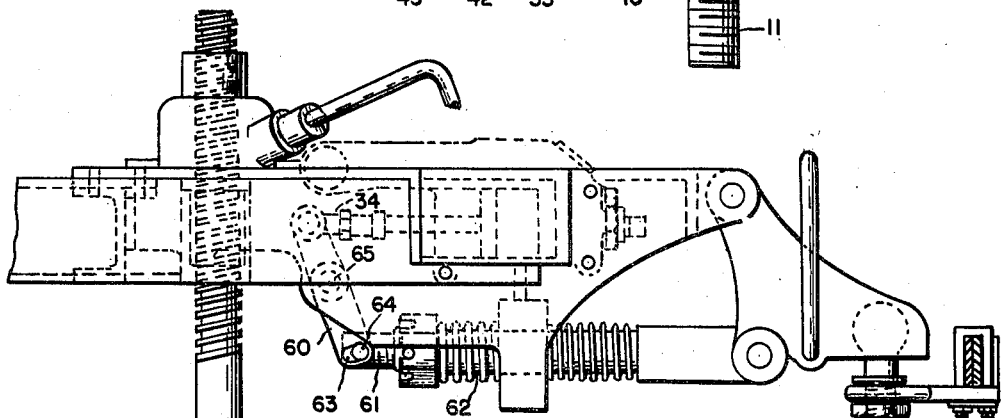
FIG.5.
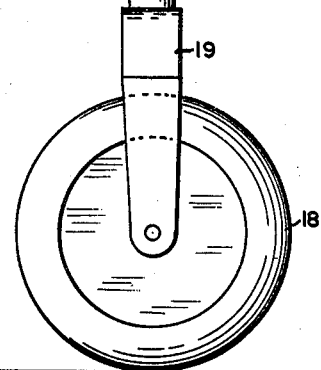
INVENTOR.
CARL J. WAGNER
BY
*Whittemore Hulbert & Belknap*
ATTORNEYS Feb. 15, 1944.   C. J. WAGNER   2,341,965
SURGE BRAKE TRAILER COUPLING
Filed Jan. 26, 1942   2 Sheets-Sheet 2
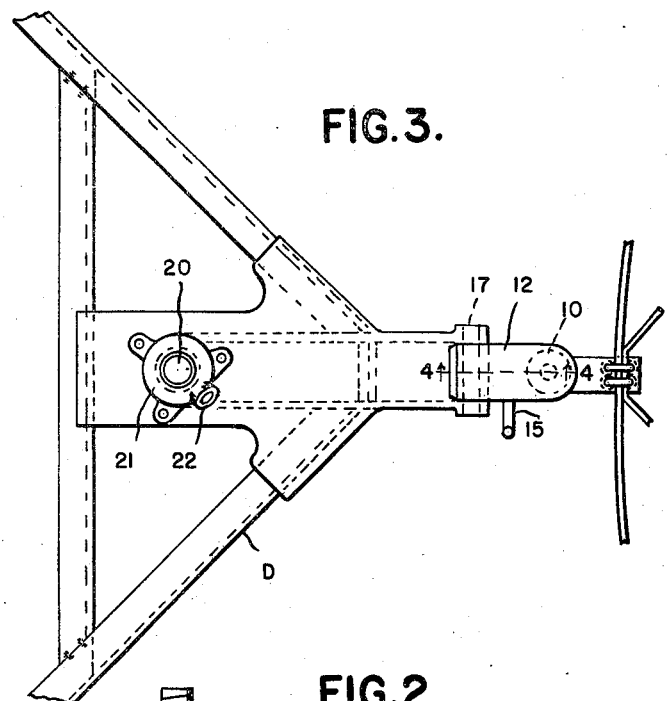
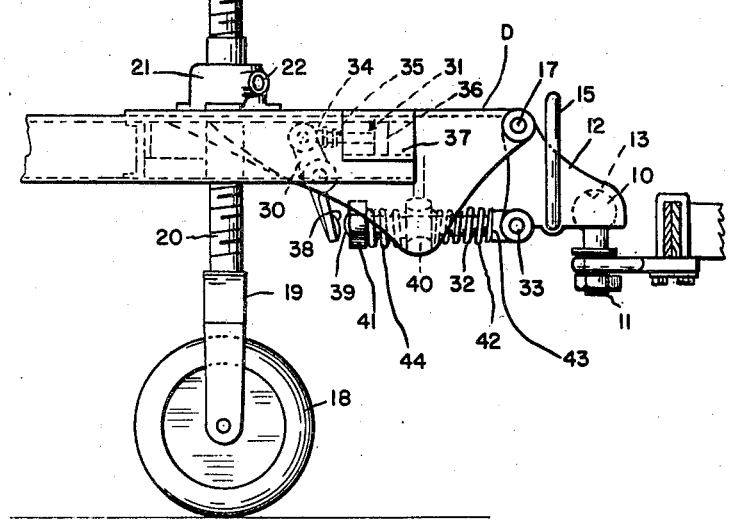
INVENTOR.
CARL J. WAGNER
BY
Whittemore Hulbert & Belknap
ATTORNEYS Patented Feb. 15, 1944

2,341,965

UNITED STATES PATENT OFFICE 2,341,965

SURGE BRAKE TRAILER COUPLING

Carl J. Wagner, Detroit, Mich.

Application January 26, 1942, Serial No. 428,298

10 Claims. (Cl. 188—142)

This invention relates generally to vehicle couplings and refers more particularly to a coupling between a motor driven vehicle and a trailer or trailer coach.

One of the essential objects of the invention is to provide a coupling of the type mentioned that is operable when the brakes of the motor driven vehicle are applied to actuate suitable brake mechanism of the trailer.

Another object is to provide a coupling that is independent of the brake mechanism of the motor vehicle, but is operatively associated in such a way with the brake mechanism of the trailer that operation of the trailer brakes is automatic and is preferably accomplished by the surge action of the trailer when the brakes of the motor driven or towing vehicle are applied.

Another object is to provide a coupling capable of utilizing the surge action of the trailer to actuate the brake mechanism thereof without being subjected to shearing loads or undue stresses which might bind, break, or otherwise interfere with the proper operation of the parts.

Another object is to provide a combination coupling and brake actuator of the class described that is simple in construction, strong and durable, comparatively inexpensive to manufacture, easy to install, and efficient and positive in operation.

Other objects, advantages and novel details of construction of this invention will be made more apparent as this description proceeds, especially when considered in connection with the accompanying drawings, wherein:

Figure 1 is a diagrammatic top plan view of a motor driven vehicle and a trailer having a coupling and brake actuator embodying my invention;

Figure 2 is a fragmentary elevational view of the coupling and brake actuator;

Figure 3 is a top plan view of the structure illustrated in Figure 2;

Figure 4 is a vertical sectional view taken substantially on the line 4—4 of Figure 3; and Figure 5 is a view similar to Figure 2, but showing a slight modification.

Referring now to the drawings, A is the towing vehicle, B is the vehicle to be towed, and C is a combination coupling and brake actuator embodying my invention located between and connected to said vehicles.

As shown, the towing vehicle A is a self-propelled vehicle, such as a motor driven vehicle, but may be any suitable vehicle capable of towing or pulling another vehicle, while the vehicle B to be towed is a freewheeling vehicle, such as a trailer or trailer coach, but may be any suitable vehicle capable of being hauled or towed by another vehicle.

The combination coupling and brake actuator C preferably consists of a coupler ball 10 having an attaching shank 11 fixed to the rear end of the motor vehicle A, and a coupler head 12 having a socket 13 and spring-pressed retainer arm 14, respectively, for receiving and holding the ball 10, and having a structural member or attaching frame D fixed to the forward end of the trailer B. Any suitable means, such as the hand lever 15, may be used to release the retainer arm 14 against the tension of the spring 16 when it is desired to uncouple the head 12 from the ball 10.

In the present instance, the coupler head 12 is preferably separate from and pivoted at 17 to the attaching frame D, and the latter is provided with a vertically adjustable ground-engaging wheel 18 for supporting the forward end of the trailer B when the trailer is uncoupled from the motor vehicle A. Preferably this wheel 18 is carried by a fork 19 at the lower end of a vertical shaft 20 that threadedly engages a geared lifting device of conventional design within the housing 21 on the attaching frame D. Any suitable means, such as a crank (not shown), may be inserted in an opening 22 in one side of the housing 21 to operate the lifting device when it is desired to raise the wheel 18 after the trailer B has been coupled to the motor vehicle A or to lower the wheel 18 just before the trailer B is to be uncoupled from the motor vehicle A.

In order that suitable brake mechanism for the trailer B may be actuated automatically by the surge action of the trailer when the motor vehicle A is stopped or appreciably slowed up, I have provided a pivotally mounted lever 30 for actuating the hydraulic brake mechanism 31 of the trailer B, and a plunger or rod 32 free of and normally spaced from said lever 30, but pivotally connected at 33 to the coupler head 12 so it may be actuated thereby to operate the lever 30. Preferably the brake actuating lever 30 is pivoted intermediate its ends to the frame D and has its upper end pivotally connected to a rod 34 which may be connected to the stem 35 of a piston 36 within a master cylinder 37 of the hydraulic brake mechanism for the trailer, or to any mechanical brake mechanism (not shown) for said trailer. The lower end of the lever 30 is free and preferably has a rounded portion 38 in the path of and constituting an abutment for the rounded rear end 39 of the plunger 32. In this connection, it will be noted that the space between the rounded portion 38 of the lever 30 and the rounded rear end 39 of the plunger 32 is sufficient to prevent accidental movement of the lever 30 by the plunger 32 during the normal movement or travel of the coupled vehicles.

The plunger 32 extends loosely through a boss 40 of the frame D and is provided at its rear end with a nut 41. A relatively light coil spring 42 is sleeved on the plunger 32 between a shoulder 43 thereof adjacent the pivot 33 and the boss 40, while a relatively heavy coil spring 44 is sleeved on said plunger 32 between the boss 40 and nut 41. These springs 42 and 44 serve to normally maintain the coupler head 12 in its proper position relative to the frame D and, thus, serve to maintain the plunger 32 in its forward position out of contact with the brake actuating lever 30. The light spring 42 permits rearward movement of the plunger 32 into operative engagement with the brake actuating lever 30 when the motor vehicle A is stopped, and returns the plunger 32 to normal position out of contact with said lever 30 when the motor vehicle A again moves forward, while the heavy spring 44 resists any tendency of the plunger 32 to move forward from said normal position when the trailer B is being hauled by the motor vehicle A. Due to this construction, the plunger 32 is free of the vertical load of the trailer as this is taken up by the head 12 and ball 10, hence the plunger 32 is free to move back and forth, as described, without being subjected to any loads or stresses that might tend to shear the same.

In use, when the motor vehicle A is appreciably slowed up or stopped by the application of its brakes, the resulting forward surging action of the trailer B will cause the frame D and head 12 of the coupling to jackknife about the upper pivot 17 so that the head 12 will cause the plunger 32 connected thereto by the lower pivot 33 to move rearwardly into operative engagement with the lever 30 so that the latter will actuate the piston 36 of the hydraulic brake mechanism 31 or other suitable brake mechanism of the trailer.

In Figure 5, I have illustrated a slight modification wherein the lower end of the brake actuating lever 60 has a slotted connection with a rearward endwise extension 61 of the plunger 62 instead of being free and normally spaced therefrom. Preferably the slot 63 in said lever 60 for the connecting pin 64 on said extension 61 is curved slightly so as to be substantially concentric with the pivot 65 for said lever 60. Otherwise, the construction and operation of the parts are the same as in Figures 1 to 4, inclusive.

What I claim as my invention is:

1. A device of the class described comprising a frame attachable to a trailer, a coupler head pivotally suspended from said frame, a coupler ball having a universal connection with the coupler head and having a shank attachable to a pulling vehicle for the trailer, a brake actuating lever carried by the frame in spaced relation to the coupler head, and a plunger slidable freely in a part of the frame and operable by the coupler head to actuate the brake lever.

2. A device of the class described comprising a frame attachable to a trailer, a coupler head pivotally suspended from said frame, a coupler ball having a universal connection with the coupler head and having a shank attachable to a pulling vehicle for the trailer, a brake actuating lever carried by the fame in spaced relation to the coupler head, and means operable by the coupler head to actuate the brake lever including a plunger extending between said coupler head and lever, said plunger being connected to one of said elements and free of the other.

3. A device of the class described comprising a frame attachable to a trailer, a coupler head pivotally suspended from said frame, a coupler ball having a universal connection with the coupler head and having a shank attachable to a pulling vehicle for the trailer, a brake actuating lever carried by the frame in spaced relation to the coupler head, means operable by the coupler head to actuate the brake lever including a plunger extending between said coupler head and lever, and means cooperating with a part of the frame and plunger to relieve the latter of any shearing loads or stresses tending to bind the plunger during operation thereof.

4. A device of the class described comprising a structural draft member attachable to a trailer, a coupler head suspended from said draft member, a coupler ball having a universal connection with the coupler head and having a shank attachable to a pulling vehicle for the trailer, a brake actuating lever carried by the draft member in spaced relation to the coupler head, and a plunger slidable freely in a part of the draft member and operable by the coupler head to actuate the brake lever, said plunger being free of shearing loads and stresses tending to bind the plunger during operation thereof.

5. A device of the class described comprising a structural draft member attachable to a trailer, a coupler head pivotally suspended from said draft member, a coupler ball having a universal connection with the coupler head and having a shank attachable to a pulling vehicle for the trailer, a brake actuating lever carried by the draft member in spaced relation to the coupler head, means operable by the coupler head to actuate the brake lever including a plunger extending between said coupler head and lever, said plunger being connected to one of said elements and free of the other, and means cooperating with a part of the draft member and plunger to relieve the latter of any shearing loads or stresses tending to bind the plunger during operation thereof.

6. A device of the class described comprising a frame attachable to a trailer, a coupler head pivotally suspended from said frame, a coupler ball having a universal connection with the coupler head and having a shank attachable to a pulling vehicle for the trailer, a brake actuating lever carried by the frame in spaced relation to the coupler head, a boss carried by the frame, a plunger slidable freely in the boss and operable by the coupler head to actuate the brake lever, abutments on the plunger upon opposite sides of the boss, and coil springs sleeved on the plunger between the boss and abutments, one of said springs being light in weight to permit movement of the plunger from normal position into operative relation with the brake lever when the pulling vehicle is stopped and operable to return the plunger to normal position when the pulling vehicle again moves forward, the other of said springs being relatively heavy to resist any tendency of the plunger to move from its normal position toward the pulling vehicle when the latter is pulling the trailer.

7. A device of the class described comprising a structural draft member attachable to a trailer, a coupler head suspended from said draft member, a coupler ball having a universal connection with the coupler head and having a shank attachable to a pulling vehicle for the trailer, a brake actuating lever carried by the draft member in spaced relation to the coupler head, a boss carried by the draft member, a plunger slidable freely in the boss and operable by the coupler head to actuate the brake lever, said plunger being connected to the coupler head but free of the brake lever, abutments on the plunger upon opposite sides of the boss, and coil springs sleeved on the plunger between the boss and abutments, one of said springs being light in weight to permit movement of the plunger from normal position into operative relation with the brake lever when the pulling vehicle is stopped and operable to return the plunger to normal position when the pulling vehicle again moves forward, the other of said springs being heavy to resist any tendency of the plunger to move from its normal position toward the pulling vehicle when the latter is pulling the trailer.

8. A device of the class described comprising a structural draft member attachable to a trailer, a coupler head suspended from said draft member, a coupler element connected to the coupler head and having a shank attachable to a pulling vehicle for the trailer, a brake actuating member carried by the draft member in spaced relation to the coupler head, and a plunger slidable freely in a part of the draft member and operable by the coupler head to actuate the brake member, said plunger being free of shearing loads and stresses tending to bind the plunger during operation thereof.

9. A device of the class described comprising a frame attachable to a trailer, a coupler head pivotally suspended from said frame, a coupler element connected to the coupler head and having a shank attachable to a pulling vehicle for the trailer, a brake actuating lever carried by the frame in spaced relation to the coupler head, a boss carried by the frame, a plunger slidable freely in the boss and operable by the coupler head to actuate the brake lever, abutments on the plunger upon opposite sides of the boss, and coil springs sleeved on the plunger between the boss and abutments, one of said springs permitting movement of the plunger from a normal inactive position to actuate the brake lever when the pulling vehicle is stopped and operable to return the plunger to normal inactive position when the pulling vehicle again moves forward, the other of said springs being operable to resist any tendency of the plunger to move from its normal inactive position toward the pulling vehicle when the latter is pulling the trailer.

10. A device of the class described comprising a structural draft member attachable to a trailer, a coupler head suspended from said draft member, a coupler element connected to the coupler head and having a shank attachable to a pulling vehicle for the trailer, a brake actuating member carried by the draft member in spaced relation to the coupler head, a boss carried by the draft member, a plunger slidable freely in the boss and operable by the coupler head to actuate the brake member, abutments on the plunger upon opposite sides of the boss, and coil springs sleeved on the plunger between the boss and abutments.

CARL J. WAGNER.